United States Patent
Hoshikawa et al.

(10) Patent No.: US 6,710,810 B1
(45) Date of Patent: Mar. 23, 2004

(54) VIDEO SIGNAL PROCESSING APPARATUS WITH RESOLUTION ENHANCING FEATURE

(75) Inventors: Masanori Hoshikawa, Yamanashi (JP); Hiroshi Kida, Yamanashi (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/340,233

(22) Filed: Jul. 1, 1999

(30) Foreign Application Priority Data

Jul. 2, 1998 (JP) .......................................... 10-187781
Jul. 2, 1998 (JP) .......................................... 10-187782

(51) Int. Cl.[7] ................................................ H04N 7/01
(52) U.S. Cl. ........................ 348/441; 348/458; 348/581
(58) Field of Search ................................. 348/441, 448, 348/458, 581, 704; 382/298, 299, 300; H04N 7/01, 11/20, 9/74

(56) References Cited

U.S. PATENT DOCUMENTS

| | | | | |
|---|---|---|---|---|
| 5,754,243 A | * | 5/1998 | Kurihara et al. | 348/445 |
| 5,793,433 A | * | 8/1998 | Kim et al. | 348/445 |
| 6,151,079 A | * | 11/2000 | Nagata et al. | 348/581 |
| 6,348,950 B1 | * | 2/2002 | Kishida | 348/458 |
| 6,380,979 B1 | * | 4/2002 | Tokoi et al. | 348/458 |
| 6,392,711 B1 | * | 5/2002 | Kesatoshi | 348/581 |

* cited by examiner

Primary Examiner—Sherrie Hsia
(74) Attorney, Agent, or Firm—Perman & Green, LLP

(57) ABSTRACT

An apparatus for enhancing the resolution of video data in a reduced scale of apparatus, and a video signal processing apparatus for freely setting the number of video data sequences for enhancing the resolution, is created from one horizontal scanning line portion of an incoming video data sequence, without changing the circuit configuration. The resolution enhancement processing apparatus stores every one horizontal line portion of each video data in an incoming video data sequence sequentially in a plurality of memories. A first video data group and a second video data group of horizontal scanning line portion of different scan periods are read repetitively N times within one horizontal scan period. The first video data group and the second video data group are mixed at varying mixing ratios to generate a video data sequence which has the vertical resolution enhanced by a factor of N.

3 Claims, 6 Drawing Sheets

$D1 \cdot K1 + D2 \cdot (1-K1)$
$D1 \cdot K2 + D2 \cdot (1-K2)$
$D1 \cdot K3 + D2 \cdot (1-K3)$
$\}$
$D1 \cdot Kn + D2 \cdot (1-Kn)$
$D2 \cdot K1 + D3 \cdot (1-K1)$
$D2 \cdot K2 + D3 \cdot (1-K2)$
$D2 \cdot K3 + D3 \cdot (1-K3)$
$\}$
$D2 \cdot Kn + D1 \cdot (1-Kn)$
$D3 \cdot K1 + D1 \cdot (1-K1)$
$D3 \cdot K2 + D1 \cdot (1-K2)$
$D3 \cdot K3 + D1 \cdot (1-K3)$
$\}$
$D3 \cdot Kn + D1 \cdot (1-Kn)$

FIG. 4

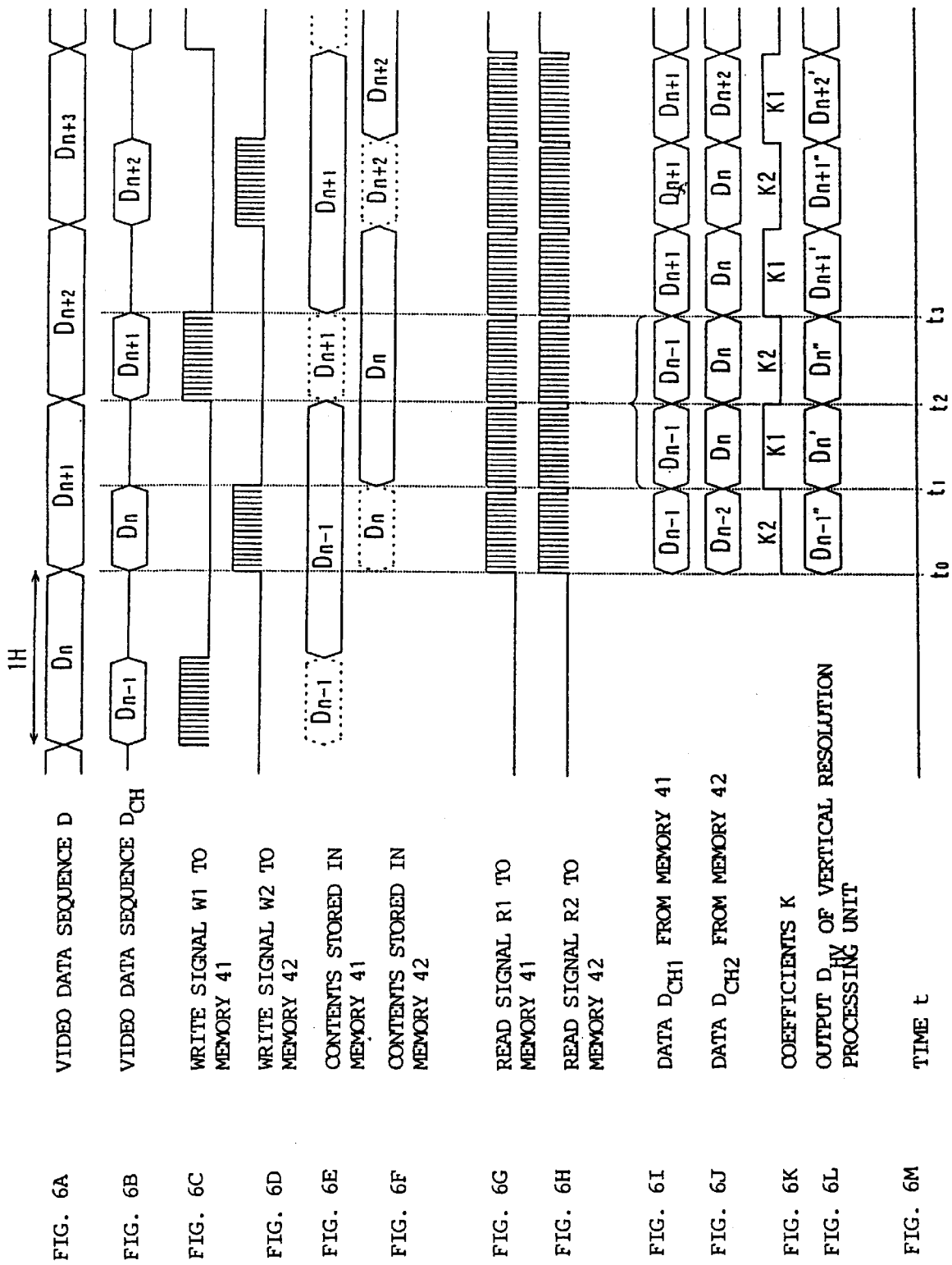

VIDEO SIGNAL PROCESSING APPARATUS WITH RESOLUTION ENHANCING FEATURE

BACKGROUND OF THE INVENTION

1. Field of the Invention

The present invention relates to a video signal processing apparatus such as a resolution processing apparatus or the like for artificially enhancing the resolution of video data.

2. Description of Related Art

Currently, multi-scan display devices are predominant in display devices for use with personal computers, as they can support a variety of display modes which may have the resolution of 640 (horizontal direction)×480 (vertical direction) dots; 800×600 dots; 1024×768 dots; or 1600×1200 dots. For displaying video data having the resolution of 800×600 dots on a full screen of such a display device when it is in a mode of displaying, for example, 1600×1200 dots, signal processing is performed to scale up the video data by a factor of two both in the vertical direction and in the horizontal direction to enhance the resolution of the video data to 1600×1200 dots.

A video signal in accordance with a television standard such as the NTSC standard, has a predefined resolution. Therefore, a television receiver for treating video signals of such the television standard supports the resolution corresponding to this video signal. In recent years, however, high definition television receivers have become commercially available for displaying a video image in a higher resolution than that defined in the television standard. Specifically, the high definition television receiver enlarges a video signal in each of the vertical direction and the horizontal direction, by a desired factor in each direction, to artificially enhance the resolution of a video image, thereby allowing the video image displayed in such a higher resolution.

In this way, such high definition television receivers and the aforementioned personal computers have implemented a resolution change for enlarging an incoming video signal (video data) by a factor of n in each of the vertical direction and the horizontal direction to artificially enhance the resolution of the video signal.

FIG. 1 illustrates a resolution processing apparatus for performing the resolution change, as mentioned above, for incoming video data.

Referring specifically to FIG. 1, the resolution processing apparatus comprises a sampling frequency conversion unit 1; a horizontal resolution processing circuit 5; a vertical resolution processing circuit 6; and a resolution processing control circuit 15.

A timing detector circuit 3 in the sampling frequency conversion unit 1 detects a sampling timing of an incoming video data sequence D composed, for example, of series of 8-bit video data, and supplies a line memory 2 with a write signal in response to each detected timing. It should be noted that each of the video data corresponds to each pixel on a display device 14, later described. The line memory 2 sequentially fetches each video data in the video data sequence D in response to the write signal. The video data sequence D fetched in the line memory 2 as mentioned above is read therefrom in the fetched order in response to a read signal supplied to the line memory 2 from the resolution processing control circuit 15, later described, and supplied to the horizontal resolution processing circuit 5 as a video data sequence $D_C$. The line memory 2 is organized, for example, of FIFO (First In First Out) memories or the like which have a storage capacity for one horizontal scanning line (hereinafter called the "1H") in the video data, and which can simultaneously and independently execute a write operation and a read operation.

With the configuration as mentioned, the sampling frequency conversion unit 1 converts the sampling frequency of the incoming video data sequence D to a higher sampling frequency which is adapted to the processing rate of the resolution processing apparatus (for the video data sequence $D_C$), and supplies the higher sampling frequency to the horizontal resolution processing circuit 5.

The sampling frequency is converted for the following reason.

For displaying a moving image, an incoming video signal must be displayed without interruption. However, when the video signal is subjected to a variety of resolution enhancement processing, a continuous display of the moving image cannot be maintained occasionally due to the influence of a delay caused by the processing. To solve this problem, the sampling frequency conversion unit 1 is used to increase the sampling frequency of the incoming video data sequence D (corresponding to the video signal) to provide a higher processing rate in the resolution enhancement processing.

The horizontal resolution processing circuit 5 interpolates the video data sequence $D_C$ having the sampling frequency increased by the sampling frequency conversion unit 1 to generate a video data sequence $D_{CH}$ with an enhanced resolution in the horizontal direction, and supplies the vertical resolution processing circuit 6 with the video data sequence $D_{CH}$.

A line memory 7 in the vertical resolution processing circuit 6 delays the video data sequence $D_{CH}$ by a time corresponding to 1H of the video data sequence $D_{CH}$ to generate a delayed video data sequence $DD_{CH}$ which is output therefrom. In this event, the line memory 7 is organized, for example, of FIFO (First In First Out) memories or the like which have a storage capacity for 1H video data in the video data sequence $D_{CH}$.

A mixer circuit 9 is composed of a first multiplier for multiplying the current video data sequence $D_{CH}$ by a coefficient K1; a second multiplier for multiplying a 1H delayed video data sequence $DD_{CH}$ by a coefficient (1−K1); and a first adder for adding outputs of the first and second multipliers to generate one line portion of first interpolated image data. Then, the mixer circuit 9 generates a 1H portion of a first video data sequence $D_{HV1}$ by the following calculation (1) using the foregoing video data sequence $D_{CH}$, delayed video data sequence $DD_{CH}$, and predetermined coefficient K1, and supplies the first video data sequence $D_{HV1}$ to a frame memory 11:

$$D_{HV1}=DD_{CH} \cdot K1+DD_{CH}(1-K1) \tag{1}$$

A mixer circuit 10, which has a similar configuration to that of the mixer circuit 9, generates a 1H portion of a second video data sequence $D_{HV2}$ by the following calculation (2) using the foregoing video data sequence $D_{CH}$ and delayed video data sequence $DD_{CH}$, and a predetermined coefficient K2, and supplies the second video data sequence $D_{HV2}$ to the frame memory 11:

$$D_{HV2}=D_{CH} \cdot K2+DD_{CH}(1-K2) \tag{2}$$

The predetermined coefficients K1, K2 have coefficient values in accordance with the degree to which the resolution is enhanced, and are generated by the resolution processing control circuit 15.

With the configuration as described, the vertical resolution processing circuit 6 newly generates 2H portions of video data sequences ($DH_{HV1}$, $D_{HV2}$) based on a 1H portion of video data sequence in the video data sequence $D_{CH}$, and a video data sequence 1H before this video data sequence. Thus, a video data sequence having the number of horizontal scanning lines twice as much as the incoming original video data sequence D is generated, thereby enhancing the vertical resolution. It should be noted that each of the predetermined coefficients K1, K2 has a coefficient value in accordance with the degree to which the resolution is enhanced, and is generated by the resolution processing control circuit 15.

The frame memory 11 alternately stores the first video data sequence $D_{HV1}$ and the second video data sequence $D_{HV2}$. Subsequently, the stored image data are sequentially read from the frame memory 11, and supplied to the display device 14 of a matrix display type such as a plasma display panel, by way of example, as a high definition video data sequence DH. One screen of the display device 14 may be formed of (n·m) pixels in a matrix of n rows and m columns. In this configuration, the number of rows n indicates the vertical resolution, while the number of columns m indicates the horizontal resolution. They correspond to the resolution in the high definition video data sequence DH.

As described above, in the resolution processing apparatus illustrated in FIG. 1, an incoming video data sequence is interpolated to enhance the horizontal resolution. Further, 2H portions of video data are generated from a 1H portion of video data in such a video data sequence to enhance the vertical resolution by a factor of two.

In the configuration illustrated in FIG. 1, however, since the horizontal resolution processing circuit 5 causes an increase in the amount of data corresponding to 1H due to an enhanced horizontal resolution in the video data, the storage capacity of the line memory 7 must be increased due to the increase in the amount of data.

For example, the line memory 7 requires a storage capacity for 2H portions of video data when the horizontal resolution processing circuit 5 enhances the horizontal resolution by a factor of two; 3H portions of video data when enhancing by a factor of three; and 4H portions of video data when enhancing by a factor of four.

As will be appreciated, the configuration illustrated in FIG. 1 implies a problem in that the scale of the apparatus is increased in proportion to the degree of the resolution enhancement.

In addition, without limited to the foregoing configuration, three or more mixers and data lines can be provided for one input. For example, when three each of mixers and data lines are provided for one input, three outputs can be generated for one input, so that a resulting image can be enlarged maximally by a factor of three in the vertical direction.

For example, for enlarging a video signal having pixels in a matrix form of horizontally 640×vertically 480 by a factor of three both in the horizontal and vertical directions, the foregoing configuration requires a line memory having the capacity of 640 pixels as the line memory 2 and a line memory having the capacity of 1,920 pixels as the line memory 7, because the vertical enlargement processing is performed after the horizontal enlargement processing, thus requiring the total capacity of 2,560 pixels.

In this case, the resolution processing circuit would require the number of data lines equal to the scaling factor, i.e., three data lines, and a total of six multipliers in the mixer circuits.

As described above, the conventional circuit configuration must be provided with a complicated mixer circuit sufficient for accommodating a scaling factor in the vertical direction, and a corresponding number of data lines. This leads to another problem that the circuit configuration must be modified each time the scaling factor is changed in the vertical direction.

OBJECTS AND SUMMARY OF THE INVENTION

The present invention has been made to solve the problems mentioned above, and is intended to provide an apparatus for enhancing the resolution of video data in a smaller apparatus scale.

It is another object of the present invention to provide a video signal processing apparatus which is capable of changing an scaling factor without modifying its circuit configuration.

According to a first feature, the present invention provides an apparatus for enhancing the resolution of video data adapted to enhance the resolution of an incoming video data sequence composed of a plurality of video data each corresponding to a pixel, to generate a high definition video data sequence, the apparatus comprising vertical resolution enhancement processing means including a plurality of memories for sequentially storing one horizontal scanning line portion of each video data in the incoming video data sequence, reading means for repetitively reading a first video data group having the one horizontal scanning line portion of video data and a second video data group having video data one horizontal scan period before the first video data group from the memories N times (where N is a natural number) within the one horizontal scan period, and mixing means for mixing the first video data group and the second video data group with a mixing ratio, where the mixing ratio is switched each time the video data groups are read from the memories, to generate a video data sequence having the resolution enhanced in the vertical direction by a factor of N; and horizontal resolution enhancement processing means for interpolating the video data sequence to generate a video data sequence having the resolution enhanced in the horizontal direction, and for outputting the video data sequence as the high definition video data sequence.

According to a second feature, the present invention provides a video signal processing apparatus comprising first and second line memories each for storing one horizontal scanning line portion of video data sequence; control means for alternately writing every horizontal scanning line of an incoming video data sequence into the line memories, and for controlling the line memories to read video data sequences therefrom; and processing means for mixing a first video data sequence read from the first line memory and a second video data sequence read from the second line memory using a coefficient to create one horizontal scanning line portion of a new video data sequence, wherein the control means repetitively reads video data sequences from the line memories a plurality of times within a time length corresponding to one horizontal scanning line portion when the video data sequence has been input, and the control means further changes the coefficient each time video data sequences are read.

According to the video signal processing apparatus of the present invention, video data sequences are repetitively read from the respective line memories a plurality of times within a time length corresponding to a 1H portion of an incoming video data sequence, and different coefficients for use in mixing the two video data sequences from the line memories are switched each time the video data sequences are read, so that a plurality of new video data sequences can be created from a current video data sequence in a time division manner in a single mixer circuit.

BRIEF DESCRIPTION OF THE DRAWINGS

FIG. 4 shows an example of mixing operations in a mixer circuit 27;

FIGS. 6A to 6M are waveform charts for explaining signals found in a variety of components in the video signal processing apparatus of FIG. 5.

DETAILED DESCRIPTION OF THE PREFERRED EMBODIMENTS

Figure 2:
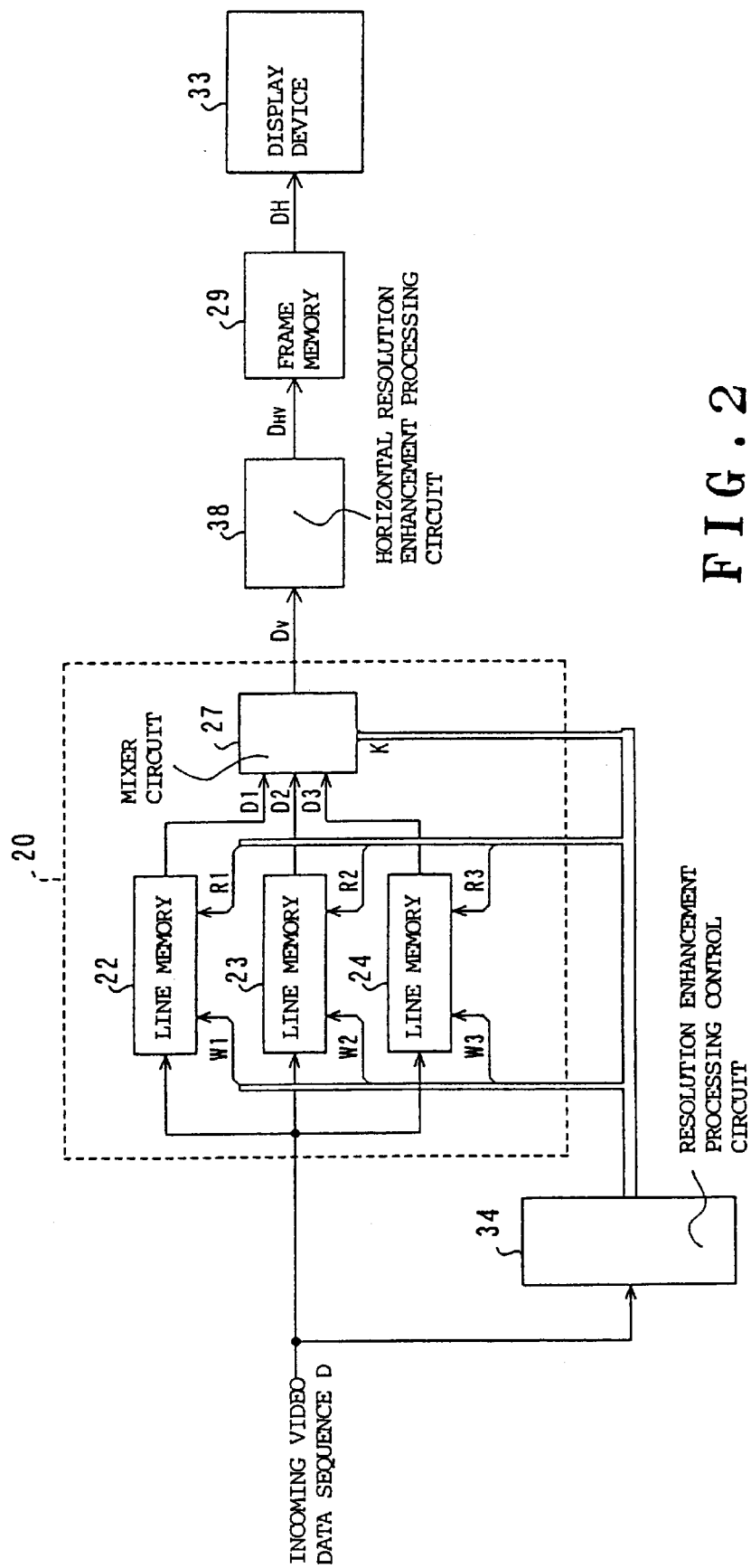
FIG. 2 is a block diagram illustrating an apparatus for enhancing the resolution of video data according to the present invention.

FIG. 2 is a block diagram illustrating a resolution enhancement processing apparatus according to the present invention. Specifically, in FIG. 2, the resolution enhancement processing apparatus comprises a vertical resolution enhancement processing circuit 20; a horizontal resolution enhancement processing circuit 38; and a resolution enhancement processing control circuit 34.

In FIG. 2, an incoming video data sequence D composed of series of, for example, 8-bit video data, each corresponding to each pixel on a screen, is supplied to the vertical resolution enhancement processing circuit 20 and to the resolution enhancement processing control circuit 34, respectively.

The vertical resolution enhancement processing circuit 20 is composed of three line memories 22–24 each having a memory capacity for one horizontal scanning line (hereinafter called "1H") in the incoming video data sequence D; and a mixer circuit 27. Each of these line memories 22–24 is organized, for example, of FIFO (First In First Out) memories or the like which can simultaneously and independently execute a write operation and a read operation.

The line memory 22 sequentially stores a 1H portion of video data in the input video data sequence D in response to a write signal W1 supplied thereto from the resolution enhancement processing control circuit 34. Subsequently, the 1H portion of video data stored as mentioned above is read from the line memory 22 in the stored order in response to a read signal R1 supplied thereto from the resolution enhancement processing control circuit 34, and supplies it to the mixer circuit 27 as a read video data group D1.

The line memory 23 sequentially stores a 1H portion of video data in the input video data sequence D in response to a write signal W2 supplied thereto from the resolution enhancement processing control circuit 34. Subsequently, the 1H portion of video data stored as mentioned above is read from the line memory 22 in the stored order in response to a read signal R2 supplied thereto from the resolution enhancement processing control circuit 34, and supplies it to the mixer circuit 27 as a read video data group D2.

The line memory 24 sequentially stores a 1H portion of video data in the input video data sequence D in response to a write signal W3 supplied thereto from the resolution enhancement processing control circuit 34. Subsequently, the 1H portion of video data stored as mentioned above is read from the line memory 24 in the stored order in response to a read signal R3 supplied thereto from the resolution enhancement processing control circuit 34, and supplies it to the mixer circuit 27 as a read video data group D3.

Figure 3:
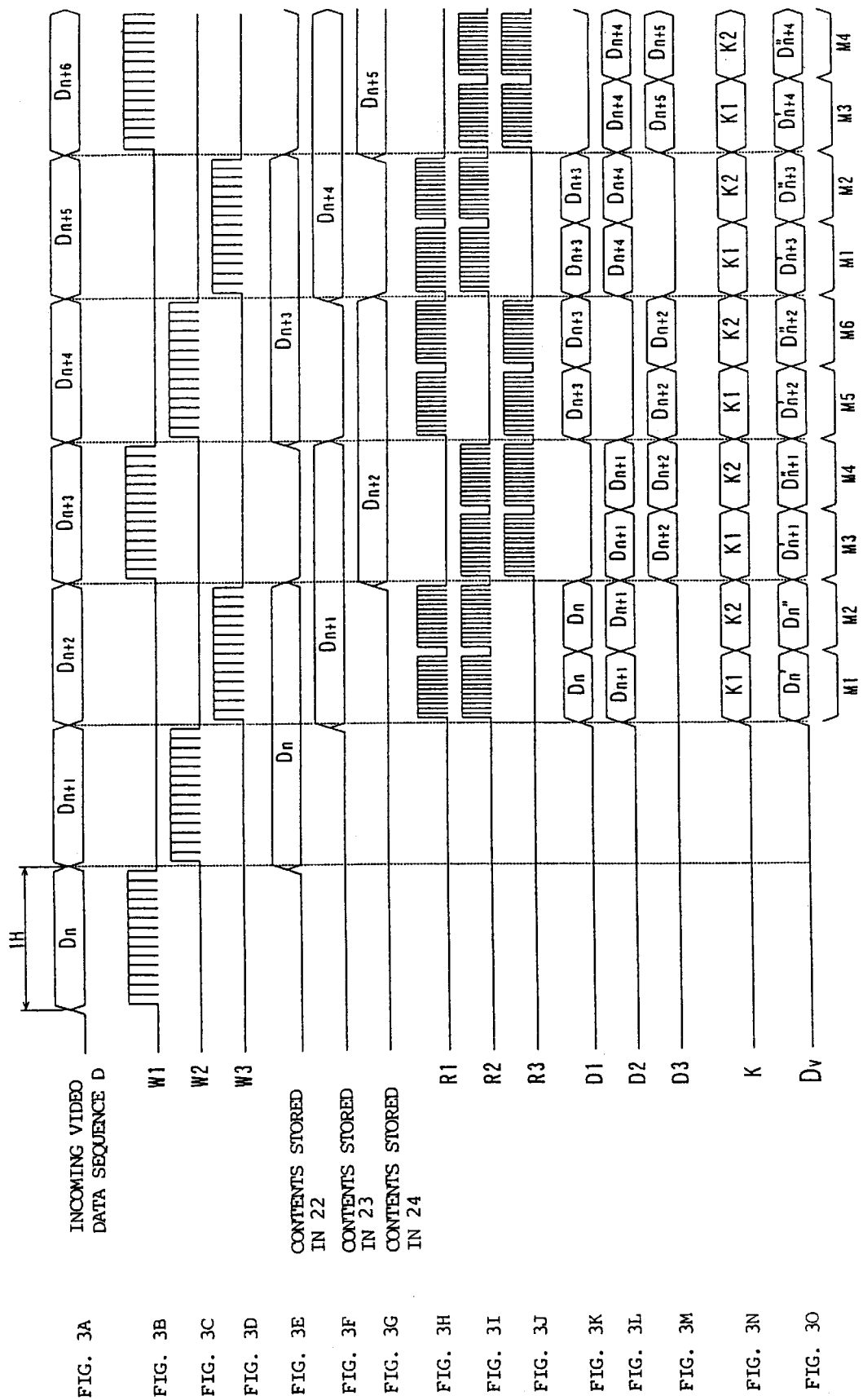
FIGS. 3A to 3O illustrate exemplary operational waveforms involved in vertical resolution enhancement processing performed by the apparatus for enhancing the resolution of video data according to the present invention.

The resolution enhancement processing control circuit 34 generates each of the write signals W1–W3 as mentioned above in response to a supply timing of each video data in the incoming video data sequence D. In this event, the resolution enhancement processing control circuit 34 sequentially generates these write signals W1–W3 in an alternative way corresponding to 1H portions of video data groups ($D_n$, $D_{n+1}$, $D_{n+2}$, . . . ) in the incoming video data sequence D, as illustrated in FIGS. 3B to 3D. Here, the frequency of each read signal R1–R3 is made different from the frequency of each write signal W1–W3 to convert a sampling frequency for the incoming video data sequence D.

The mixer circuit 27 sequentially executes mixing operations as shown in FIG. 4 using the read video data groups D1–D3 and a mixing ratio K to increase the number of data in a 1H portion of video data in one frame (field) by a factor of N (N is a natural number) to generate a video data sequence $D_V$ which has the vertical resolution enhanced by a factor of N. The video data sequence $D_V$ is then supplied to the horizontal resolution enhancement processing circuit 38.

For example, for enhancing the vertical resolution by a factor of two in the mixer circuit 27, six different mixing operations as expressed by the following equations are sequentially executed in repetition:

$$D_V = D1 \cdot K1 + D2 \cdot (1-K1) \tag{3}$$

$$D_V = D1 \cdot K2 + D2 \cdot (1-K2) \tag{4}$$

$$D_V = D2 \cdot K1 + D3 \cdot (1-K1) \tag{5}$$

$$D_V = D2 \cdot K2 + D3 \cdot (1-K2) \tag{6}$$

$$D_V = D1 \cdot K1 + D3 \cdot (1-K1) \tag{7}$$

$$V = D1 \cdot K2 + D3 \cdot (1-K2) \tag{8}$$

In the following, the operations of the vertical resolution enhancement processing circuit 20 and the resolution enhancement processing control circuit 34 will be described with reference to operational waveforms in FIGS. 3A to 3O which illustrates waveforms involved in enhancing the resolution of video data in the vertical direction by a factor of two.

First, the resolution enhancement processing control circuit 34 detects each sampling timing of incoming video data sequence D input thereto, and supplies a write signal W1 to the line memory 22 in response to this detected timing. The line memory 22 sequentially fetches each video data in the incoming video data sequence D in response to the write signal W1 for storage therein. Subsequently, when the line memory 22 has completely fetched a 1H portion of video data group in the incoming video data sequence D, the resolution enhancement processing control circuit 34 stops supplying the write signal W1. A this time, the line memory 22 has stored and held therein a 1H portion of video data group $D_n$ as illustrated in FIG. 3E.

Next, the resolution enhancement processing control circuit 34 supplies a write signal W2 to the line memory 23 in response to each sampling timing of the incoming video data sequence D input thereto. The line memory 23 sequentially fetches each video data in the incoming video data sequence D in response to the write signal W2 for storage therein. Subsequently, when the line memory 23 has completely fetched a 1H portion of video data group in the incoming video data sequence D, the resolution enhancement processing control circuit 34 stops supplying the write signal W2. Accordingly, at this time, the line memory 23 has stored and held therein a 1H portion of video data group $D_{n+1}$ corresponding to a 1H line next to the video data group $D_n$, as illustrated in FIG. 3F.

Next, the resolution enhancement processing control circuit 34 supplies a write signal W3 to the line memory 24 in response to each sampling timing of the incoming video data sequence D input thereto. The line memory 24 sequentially fetches each video data in the incoming video data sequence D in response to the write signal W3 for storage therein. When the line memory 24 has completely fetched a 1H portion of video data group in the incoming video data sequence D, the resolution enhancement processing control circuit 34 stops supplying the write signal W3. Accordingly, at this time, the line memory 24 has stored and held therein a 1H portion of video data group $D_{n+2}$ corresponding to a 1H line next to the video data group $D_{n+1}$, as illustrated in FIG. 3G.

While the line memory 24 is fetching the video data group $D_{n+2}$ (while the line memory 24 is being supplied with the write signal W3), the resolution enhancement processing control circuit 34 repetitively generates read signals R1, R2 at a period of one-half of the sampling timing, and supplies these read signals R1, R2 to the line memories 22, 23, respectively. Responsive to the read signal R1, the 1H portion of video data group $D_n$ fetched in the line memory 22 as mentioned above is read therefrom in the fetched order, and supplied to the mixer circuit 27 as a read video data group D1. Similarly, responsive to the read signal R2, the 1H portion of video data group $D_{n+1}$ fetched in the line memory 23 as mentioned above is read therefrom in the fetched order, and supplied to the mixer circuit 27 as a read video data group D2. Meanwhile, the resolution enhancement processing control circuit 34 supplies the mixer circuit 27 with a predetermined mixing ratio K1. The mixer circuit 27 performs a mixing operation as expressed by the following equation (9) using the mixing ratio K1 to mix the read video data group D1, i.e., each video data in the video data group $D_n$, and the read video data group D2, i.e., each video data in the video data group $D_{n+1}$ to generate D'$_n$ which is output as a video data sequence $D_V$:

$$D'_n = D_n \cdot K1 + D_{n+1} \cdot (1-K1) \quad (9)$$

When all the contents stored in each of the line memories 22, 23 have been read therefrom, the resolution enhancement processing control circuit 34 again supplies each of the line memories 22, 23 repetitively with the read signal R1 or R2 having a period of one-half of the sampling timing, as illustrated in FIG. 3H or 3I. Responsive to the read signal R1, the video data group $D_n$ is again read from the line memory 22 in the fetched order, and supplied to the mixer circuit 27 as a read video data group D1. Similarly, responsive to the read signal R2, the video data group $D_{n-1}$ is read from the line memory 23 in the fetched order, and supplied to the mixer circuit 27 as a read video data group D2. Meanwhile, the resolution enhancement processing control circuit 34 supplies the mixer circuit 27 with a predetermined mixing ratio K2. The mixer circuit 27 performs a mixing operation as expressed by the following equation (10) using the mixing ratio K2 to mix the read video data group D1, i.e., each video data in the video data group $D_n$, and the read video data group D2, i.e., each video data in the video data group $D_{n+1}$ to generate D''$_n$ which is output as a video data sequence $D_V$:

$$D''_n = D_n \cdot K2 + D_{n+1} \cdot (1-K2) \quad (10)$$

When the line memory 24 has fetched all the video data group $D_{n+2}$ in the incoming video data sequence D, the resolution enhancement processing control circuit 34 again starts supplying the line memory 22 with the write signal W1 corresponding to each sampling timing of the incoming video data sequence D input thereto. Responsive to the write signal W1, the line memory 22 sequentially fetches and stores therein each video data in the incoming video data sequence D input thereto. Subsequently, when the line memory 22 has fetched a 1H portion of video data group in the incoming video data sequence D, the resolution enhancement processing control circuit 34 stops supplying the write signal W1. Accordingly, at this time, the line memory 22 has stored and held therein a 1H portion of video data group $D_{n+3}$, as illustrated in FIG. 3E.

While the line memory 22 is fetching the video data group $D_{n+3}$ (while the line memory 22 is being supplied with the write signal W3), the resolution enhancement processing control circuit 34 repetitively generates read signals R2, R3 at a period of one-half of the sampling timing, and supplies these read signals R2, R3 to the line memories 23, 24, respectively. Responsive to the read signal R2, the 1H portion of video data group $D_{n+1}$ fetched in the line memory 23 as mentioned above is read therefrom in the fetched order, and supplied to the mixer circuit 27 as a read video data group D2. Similarly, responsive to the read signal R3, the 1H portion of video data group $D_{n+2}$ fetched in the line memory 24 as mentioned above is read therefrom in the fetched order, and supplied to the mixer circuit 27 as a read video data group D3. Meanwhile, the resolution enhancement processing control circuit 34 supplies the mixer circuit 27 with the predetermined mixing ratio K1. The mixer circuit 27 performs a mixing operation as expressed by the following equation (11) using the mixing ratio K1 to mix the read video data group D2, i.e., each video data in the video data group $D_{n+1}$, and the read video data group D3, i.e., each video data in the video data group $D_{n+2}$ to generate D'$_{n+1}$ which is output as a video data sequence $D_V$:

$$D'_{n+1} = D_{n+1} \cdot K1 + D_{n+2} \cdot (1-K1) \quad (11)$$

When all the contents stored in each of the line memories 23, 24 have been read therefrom, the resolution enhancement processing control circuit 34 again supplies each of the line memories 23, 24 repetitively with the read signal R2 or R3 having a period of one-half of the sampling timing, as illustrated in FIG. 3I or 3J. Responsive to the read signal R2, the video data group $D_{n+1}$ is read again from the line memory 23 in the fetched order, and supplied to the mixer circuit 27 as a read video data group D2. Similarly, responsive to the read signal R3, the video data group $D_{n+2}$ is read again from the line memory 24 in the fetched order, and supplied to the mixer circuit 27 as a read video data group D3. Meanwhile, the resolution enhancement processing control circuit 34 supplies the mixer circuit 27 with the predetermined mixing ratio K2. The mixer circuit 27 performs a mixing operation as expressed by the following equation (12) using the mixing ratio K2 to mix the read video data group D2, i.e., each video data in the video data group $D_{n+1}$, and the read video data group D3, i.e., each video data in the video data group $D_{n+2}$ to generate $D''_{n+1}$ which is output as a video data sequence $D_V$:

$$D''_{n+1}=D_{n+1}\cdot K2+D_{n+2}\cdot(1-K2) \quad (12)$$

When the line memory 22 has fetched all the video data group $D_{n+3}$ in the incoming video data sequence D, the resolution enhancement processing control circuit 34 again starts supplying the line memory 23 with the write signal W2 corresponding to each sampling timing of the incoming video data sequence D input thereto. Responsive to the write signal W2, the line memory 23 sequentially fetches and stores therein each video data in the incoming video data sequence D input thereto. Subsequently, when the line memory 23 has fetched a 1H portion of video data group in the incoming video data sequence D, the resolution enhancement processing control circuit 34 stops supplying the write signal W2. Accordingly, at this time, the line memory 23 has stored and held therein a 1H portion of video data group $D_{n+4}$, as illustrated in FIG. 3F.

While the line memory 23 is fetching the video data group $D_{n+4}$ (while the line memory 23 is being supplied with the write signal W2), the resolution enhancement processing control circuit 34 repetitively generates read signals R1, R3 at a cycle of one-half of the sampling timing, and supplies these read signals R1, R3 to the line memories 22, 24, respectively. Responsive to the read signal R1, the 1H portion of video data group $D_{n+3}$ fetched in the line memory 22 as mentioned above is read therefrom in the fetched order, and supplied to the mixer circuit 27 as a read video data group D1. Similarly, responsive to the read signal R3, the 1H portion of video data group $D_{n+2}$ fetched in the line memory 24 as mentioned above is read therefrom in the fetched order, and supplied to the mixer circuit 27 as a read video data group D3. Meanwhile, the resolution enhancement processing control circuit 34 supplies the mixer circuit 27 with the predetermined mixing ratio K1. The mixer circuit 27 performs a mixing operation as expressed by the following equation (13) using the mixing ratio K1 to mix the read video data group D1, i.e., each video data in the video data group $D_{n+3}$, and the read video data group D3, i.e., each video data in the video data group $D_{n+2}$ to generate $D'_{n+2}$ which is output as a video data sequence $D_V$:

$$D'_{n+2}=D_{n+2}\cdot K1+D_{n+3}\cdot(1-K1) \quad (13)$$

When all the contents stored in each of the line memories 22, 24 have been read therefrom, the resolution enhancement processing control circuit 34 again supplies each of the line memories 22, 24 repetitively with the read signal R1 or R3 having a period of one-half of the sampling timing, as illustrated in FIG. 3H or 3J. Responsive to the read signal R1, the video data group $D_{n+3}$ is read again from the line memory 22 in the fetched order, and supplied to the mixer circuit 27 as a read video data group D1. Similarly, responsive to the read signal R3, the video data group $D_{n+2}$ is read again from the line memory 24 in the fetched order, and supplied to the mixer circuit 27 as a read video data group D3. Meanwhile, the resolution enhancement processing control circuit 34 supplies the mixer circuit 27 with the predetermined mixing ratio K2. The mixer circuit 27 performs a mixing operation as expressed by the following equation (14) using the mixing ratio K2 to mix the read video data group D1, i.e., each video data in the video data group $D_{n+3}$, and the read video data group D3, i.e., each video data in the video data group $D_{n+2}$ to generate $D''_{n+2}$ which is output as a video data sequence $D_V$:

$$D''_{n+2}=D_{n+2}\cdot K2+D_{n+3}\cdot(1-K2) \quad (14)$$

Subsequently, the mixing operations M1–M6 as described above are repetitively executed to increase the number of data in a 1H portion of video data in one frame (field) by a factor of two, thereby generating the video data sequence $D_V$ which has the vertical resolution enhanced by a factor of two.

As described above, in the vertical resolution enhancement processing circuit 20 illustrated in FIG. 2, successive 3H portions of video data groups in an incoming video data sequence D are sequentially stored, 1H by 1H, in the three line memories 22–24. Next, a 1H portion of video data group and a video data group 1H before this video data group are respectively read from these three memories successively twice within a 1H period. Then, the 1H portion of video data group and the video data group 1H before this video data group, read at the first time, are mixed with the first mixing ratio K1 to generate a 1H portion of first video data sequence $D_V$. Further, the 1H portion of video data group and the video data group 1H before this video data group, read at the second time, are mixed with the first mixing ratio K2 to generate a 1H portion of second video data sequence $D_V$.

Stated another way, a 1H portion of input video data group and a video data group 1H before this video data group are mixed with the mixing ratio K1, and further mixed with the mixing ratio K2 to generate 2H portions of video data sequence $D_V$ from the 1H portion of the input video data group. Thus, the number of data in the 1H portion of video data group in one screen is doubled, resulting in the vertical resolution enhanced by a factor of two.

It should be noted that while the foregoing embodiment illustrated in FIGS. 3A to 3O enhances the vertical resolution by a factor of two, the scaling factor for the vertical resolution is not limited to two.

In essence, a 1H portion of video data group and a video data group 1H before this video data group are repetitively read from the line memories 22–24 within a 1H period a number of times (N times, where N is a natural number) equal to a scaling factor by which the resolution is enhanced, and both the video data groups are sequentially mixed with mixing ratios K1, K2, . . . , KN to generate a video data sequence $D_V$, thereby enhancing the vertical resolution by a factor of N. In other words, the vertical resolution can be arbitrarily changed by changing the number of times both the video data groups as mentioned are read within a 1H period.

The horizontal resolution enhancement processing circuit 38 interpolates the video data sequence $D_V$ to generate an input video data sequence $D_{HV}$, which has an enhanced horizontal resolution, and supplies the input video data sequence $D_{HV}$ to a frame memory 29. The frame memory 29 sequentially receives the input video data sequence $H_{DV}$ having the resolution enhanced both in the vertical direction and in the horizontal direction respectively by the vertical resolution enhancement processing circuit 20 and the horizontal resolution enhancement processing circuit 38, and once stores therein the input video data sequence $H_{DV}$. Further, the stored video data sequence is sequentially read from the frame memory 29, and supplied to a display device 33 of a matrix display type, such as a plasma display panel, by way of example, as a high definition input video data sequence DH.

As described above, in the resolution enhancement processing apparatus illustrated in FIG. 2, the line memories 22–24 associated with the vertical resolution enhancement processing are required to have a total storage capacity for storing only 3H portions of video data. The storage capacity does not depend on the degree of enhancement for the horizontal resolution in the horizontal resolution enhancement processing circuit 38. Further, the sampling frequency conversion function performed in the sampling frequency conversion unit 1 in FIG. 1 is implemented in the process of the vertical resolution enhancement processing performed by the vertical resolution enhancement processing circuit 20.

Figure 1:
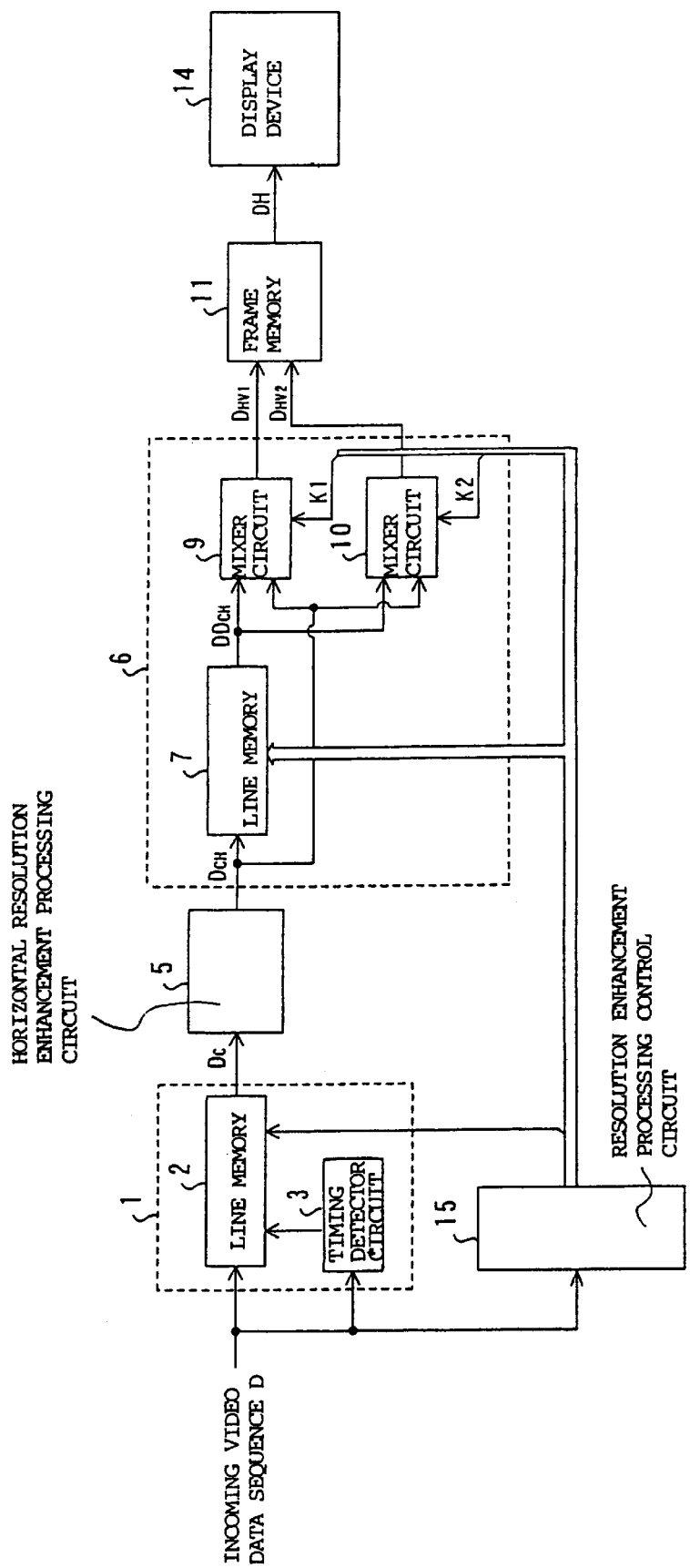
FIG. 1 is a block diagram illustrating a conventional video signal processing apparatus.

It will be therefore appreciated that the foregoing configuration can reduce the scale of the apparatus as compared with the conventional configuration as illustrated in FIG. 1, which has the sampling frequency conversion unit 1 provided with the line memory 2 having a storage capacity of 1H, and the vertical resolution enhancement processing circuit 6 provided with the line memory 7 which requires a storage capacity of 3H when the horizontal resolution is enhanced by a factor of three.

Also, in the vertical resolution enhancement processing, the vertical resolution can be arbitrarily changed by changing the number of times a 1H portion of video data group and a video data group 1H before this video data group are read from the line memories within a 1H period.

While the foregoing embodiment has shown an example in which a read signal supplied from the resolution enhancement processing control circuit 34 has the period of one-half of the sampling timing, this does not mean a limitation to the present invention. Alternatively, the resolution enhancement processing control circuit 34 may be configured to supply a read signal having a period less than one-half of the sampling timing.

According to the apparatus for enhancing the resolution of video data constituting a first feature of the present invention, as described above in detail, it is possible to reduce the scale of the apparatus independent of the degree to which the resolution is enhanced.

Next, a video signal processing apparatus according to a second feature of the present invention will be described in detail with reference to FIGS. 5 and 6A to 6M.

Figure 5:
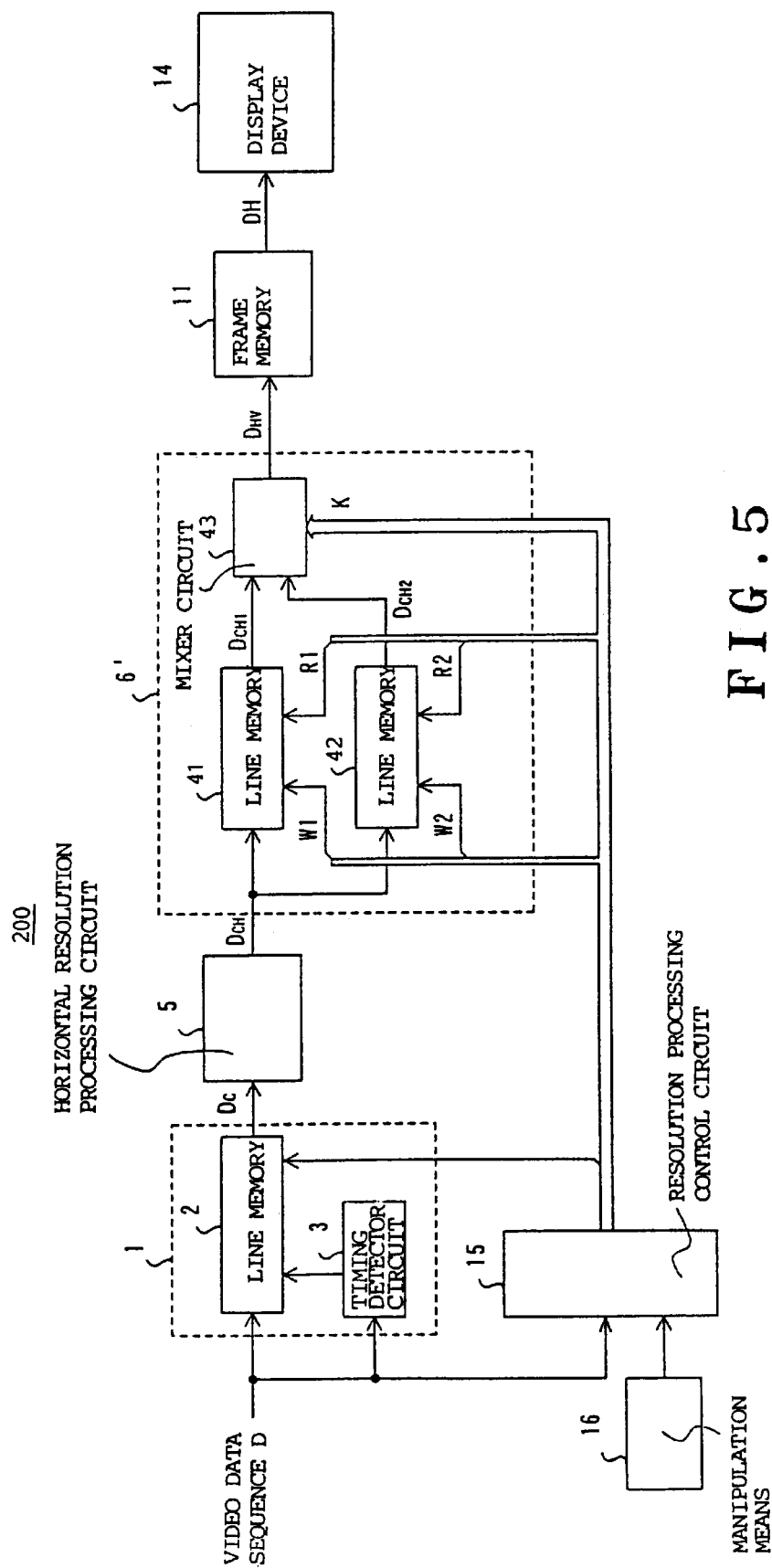
FIG. 5 is a block diagram illustrating an embodiment of a video signal processing apparatus according to the present invention.

FIG. 5 illustrates the configuration of a resolution processing apparatus, which is an embodiment of the video signal processing apparatus according to the present invention.

Referring specifically to FIG. 5, the resolution processing apparatus 200 comprises a sampling frequency conversion unit 1; a horizontal resolution processing circuit 5; a vertical resolution processing circuit 6'; and a resolution processing control circuit 15.

In the sampling frequency conversion unit 1, a timing detector circuit 3 detects a sampling timing of an incoming video data sequence D composed, for example, of series of 8bit video data, and supplies a line memory 2 with a write signal in response to each detected timing. It should be noted that each of the video data corresponds to each pixel on a display device 14, later described. The line memory 2 sequentially fetches each video data in the video data sequence D in response to the write signal. The video data sequence D fetched in the line memory 2 as mentioned above is read therefrom in the fetched order in response to a read signal supplied to the line memory 2 from the resolution processing control circuit 15, and supplied to the horizontal resolution processing circuit 5 as a video data sequence DC. The line memory 2 is organized, for example, of FIFO (First In First Out) memories or the like which have a storage capacity for one horizontal scanning line (hereinafter called the "1H") in the video data, and which can simultaneously and independently execute a write operation and a read operation.

With the configuration as mentioned, the sampling frequency conversion unit 1 converts the sampling frequency of the incoming video data sequence D to a twice or higher sampling frequency adapted to the processing rate of the resolution processing apparatus 200 (for the video data sequence $D_C$), and supplies the higher sampling frquency to the horizontal resolution processing circuit 5.

The sampling frequency is converted for the following reason.

For displaying a moving image, an incoming video signal must be displayed without interruption. However, when the video signal is subjected to a variety of resolution enhancement processing, a continuous display of the moving image cannot be maintained occasionally due to the influence of a delay caused by the processing. To solve this problem, the sampling frequency conversion unit 1 is used to increase the sampling frequency of the incoming video data sequence D (corresponding to the video signal) to provide a higher processing rate in the resolution enhancement processing.

The horizontal resolution processing circuit 5 interpolates the video data sequence $D_C$ having the sampling frequency increased by the sampling frequency conversion unit 1 to generate a video data sequence $D_{CH}$ with an enhanced resolution in the horizontal direction, and supplies the vertical resolution processing circuit 6' with the video data sequence $D_{CH}$.

The vertical resolution processing circuit 6' is constituted by line memories 41, 42; and a mixer circuit 43 serving as a processing means.

The line memories 41, 42 each have a storage capacity 27 sufficient to store video data in a 1H portion of the video data sequence $D_{CH}$ which has been enlarged in the horizontal direction, and may be organized, for example, of FIFO (First In First Out) memories or the like which can simultaneously and independently execute a write operation and a read operation. Also, the line memories 41, 42 receive and store therein the input video data sequence $D_{CH}$ in response to write signals W1, W2, respectively, supplied thereto from the resolution processing control circuit 15 serving as a control means. The stored video data sequence $D_{CH}$ is read from the line memories 41, 42 in response to read signal R1, R2 supplied thereto from the control circuit 15, and output to the mixer circuit 43.

The mixer circuit 43 is composed of a first multiplier for multiplying a 1H portion of a first video data sequence $D_{CH1}$ supplied from one line memory 41 by a coefficient K; a second multiplier for multiplying a 1H portion of a second video data sequence $D_{CH2}$ supplied from the other line memory 42 by a coefficient (1−K); and an adder for adding output data of the first and second multipliers to generate new one line portion of converted video data. Specifically, the first and second video data sequences $D_{CH1}$, $D_{CH2}$ supplied from the two line memories 41, 42 are mixed using the coefficient K supplied from the control circuit 15 by a mixing operation expressed by the following equation (15) to generate a 1H portion of video data sequence $D_{HV}$ which is supplied to the frame memory 11:

$$D_{HV}=D_{CH1} \cdot K+D_{CH2}(1-K) \tag{15}$$

The coefficient K may be varied by the control circuit 15 in accordance with the degree to which the resolution is enhanced. Thus, the mixer circuit 43 creates video data sequences corresponding to a plurality of adjacent horizontal scanning lines only by changing the coefficient K for a current video data sequence input thereto.

With the foregoing configuration, the vertical resolution processing circuit 6' creates a new video data sequence from a 1H portion of vide data sequence. This results in a video data sequence which has an increased number of horizontal scanning lines with respect to the incoming video data sequence D.

The frame memory 11 stores a video data sequence $D_{HV}$ supplied thereto from the mixer circuit 43, and the stored image data is sequentially read from the frame memory and supplied to a display device 14 of a matrix display type such as a plasma display, by way of example, as a high definition video data sequence DH.

In the display device 14, one screen is formed of (n·nm) pixels in a matrix of n rows and m columns. In this configuration, the number of rows n indicates the vertical resolution, while the number of columns m indicates the horizontal resolution. They correspond to the resolution in the high definition video data sequence DH.

A manipulation means 16 receives from the user a scaling factor in the vertical direction, i.e., a ratio in which the number of horizontal scanning lines are increased, and supplies the resolution processing control circuit 15 with the input scaling factor.

In the present invention, the vertical scaling factor may take an integer equal to or larger than two.

Next, the operation of the resolution processing apparatus of FIG. 5 will be described with reference to FIGS. 6A to 6M, taking an example in which the number of horizontal scanning lines in incoming video data is doubled in the vertical direction.

As illustrated in FIGS. 6A to 6M, a video data sequence D (see FIG. 6B) input to the resolution processing apparatus passes through a timing detector circuit 3 which detects a sampling timing from the video data sequence D, converts the sampling frequency of the video data sequence D to twice higher in this embodiment, and outputs the video data sequence having the higher frequency toward the horizontal resolution processing unit 5.

The horizontal resolution processing unit 5 changes the horizontal resolution of a data sequence supplied thereto from the sampling frequency conversion unit 1, delays the video data sequence by a time corresponding to 1H to generate a video data sequence $D_{CH}$ which is output to the vertical resolution processing unit 6' (see FIG. 6B).

The resolution processing control unit 15 supplies the line memories 41, 42 with write signals W1, W2 for instructing them to write data thereinto (see FIGS. 6C, 6D). The video data sequence is alternately written into the line memories 41, 42 by the action of the write signals W1, W2. The write signals W1, W2 are signals issued for writing a 1H portion of the video data sequence $D_{CH}$ into the memories at a time.

The video data sequence $D_{CH}$ is written into the line memory, which has received the write signal W, in synchronism with the write signal W. For example, when the line memory 42 starts receiving the write signal W2 at time t0, a data sequence $D_n$ is sequentially written only into the line memory 42 in response to sampling pulses of the write signal W2 (see FIG. 6F). Next, when the line memory 41 starts receiving the write signal W1 at time t2, the data sequence $D_n$ is sequentially written only into the line memory 41 in response to sampling pulses of the write signal W1. In this way, the data sequences are alternately written one by one into the memories 41, 42 (see FIGS. 6E, 6F).

When the data sequence $D_n$ has been written into the memory 42, the data sequences $D_{CH1}$, $D_{CH2}$ are simultaneously read from the two memories 41, 42, respectively, in synchronism with read signals R1, R2 respectively supplied to the memories 41, 42 from the resolution processing control circuit 15 at time t1, and supplied to the mixer circuit 43. For example, at time t1, in the memories 41, 42 which have received the respective read signals, a data sequence Dn−1 is sequentially read from the memory 41 as the first data sequence $D_{CH1}$, while the written data sequence Dn is sequentially read from the memory 42 as the second data sequence $D_{CH2}$.

The mixer circuit 43 mixes the first data sequence $D_{CH1}$ and the second data sequence $D_{CH2}$ using a coefficient K1 supplied thereto from the control circuit 15 by the operation previously expressed by the equation (14) to create a 1H portion of a new first video data sequence Dn' based on the data sequence Dn, and outputs this first video data sequence Dn' to the frame memory 11.

Further, at time t2 at which the first data sequence Dn' has been created, data sequences are again read repetitively from the memories 41, 42 in response to the read signals W1, W2, and the data sequences are again mixed in the mixer circuit 43. In the second reading, however, the coefficient used in the equation (14) is a coefficient K2, different from the previous coefficient K1, which is newly sent from the control circuit 15. A 1H portion of second video data sequence Dn", different from the first video data sequence, is created using the coefficient K2 and output to the frame memory 11.

In this way, data sequences are repetitively read twice from the line memories within a time length corresponding to one horizontal scanning line of the incoming video data sequence, and the different coefficients K1, K2 are used in the first and second mixing operations, thereby creating two different video data sequences having an enhanced horizontal resolution from a 1H portion of video data sequence in a time division manner.

By repeating the foregoing operation, one frame portion of video data is generated, with the number of scanning lines in the horizontal direction increased twice with respect to one frame portion of input video data, and is displayed on the display device 14 with an enhanced horizontal resolution.

In the foregoing configuration, since the processing for increasing the number of horizontal scanning lines is performed within the time length corresponding to a 1H portion of the incoming video data sequence in a time division manner, the mixer circuit only requires two multipliers and a single output line.

In the foregoing embodiment, since the sampling frequency of the data sequence is increased twice, data sequences are repetitively read from the memories twice within a period corresponding to a 1H portion of the incoming video data sequence D, and different coefficients are switched for use in the mixer circuit in synchronism with a read signal for the second reading of the data sequence. Thus, a single mixer circuit may only be required to create two different video data sequences from a single current video data sequence to increase the number of horizontal scanning lines of the data sequence twice in the vertical direction.

Furthermore, when the sampling frequency of the data sequence is increased three times, video data sequences can be repetitively read three times from the line memories 41, 42 within a period corresponding to 1H portion of the incoming data sequence D, in which case the number of horizontal scanning lines of the data sequence D can be increased three times in the vertical direction, if one of three different values is alternately applied to the coefficient K each time the video data sequences are read from the line memories.

In this way, video data sequences are repetitively read from two line memories a plurality of times within a period corresponding to a 1H portion of an input video data sequence, and different coefficients for use in mixing the video data sequences are switched each time video data sequences are read, so that a single mixer circuit may only be required to increase a 1H portion of input video data to video data having a resolution enhanced by a factor equal to the number of times the video data is repetitively read.

Consequently, according to the present invention, the number of video data sequences created from a 1H portion of an input video data sequence can be freely set without modifying the circuit configuration. It is therefore possible to freely change the vertical resolution for one frame of an input video image.

According to the present invention, video data sequences are repetitively read from two line memories a plurality of times within a period corresponding to a 1H portion of an input video data sequence, and different coefficients for use in mixing the video data sequences are switched each time the video data sequences are read from the line memories, so that a single mixer circuit may only be required to increase a 1H portion of input video data to video data having a resolution enhanced by a factor equal to the number of times the video data is repetitively read. In other words, the number of video data sequences created from a 1H portion of an input video data sequence can be freely set without modifying the circuit configuration. It is therefore possible to freely change the vertical resolution for one frame of an input video image.

What is claimed is:

1. An apparatus for enhancing the resolution of video data adapted to enhance the resolution of an incoming video data sequence composed of a plurality of video data each corresponding to a pixel, to generate a high definition video data sequence, said apparatus comprising:

vertical resolution enhancement processing means including a plurality of memories for sequentially storing one horizontal scanning line portion of each video data in said incoming video data sequence, reading means for repetitively reading a first video data group having said one horizontal scanning line portion of video data and a second video data group having video data one horizontal scan period before said first video data group from said memories N times (where N is a natural number) within said one horizontal scan period, and mixing means for mixing said first video data group and said second video data group with a mixing ratio, said mixing ratio being switched each time said video data groups are read from said memories, to generate a video data sequence having the resolution enhanced in the vertical direction by a factor of N; and horizontal resolution enhancement processing means for interpolating said video data sequence to generate a video data sequence having the resolution enhanced in the horizontal direction, and for outputting said video data sequence as said high definition video data sequence.

2. An apparatus for enhancing the resolution of video data according to claim 1, wherein:

said memories include first, second and third line memories for sequentially storing every horizontal scanning line portion of each video data in said incoming video data sequence; and said reading means includes:

a first reading process for simultaneously reading from each of said first and second line memories to output a video data group read from said first line memory as said first video data group and a video data group read from said second line memory as said second video data group;

a second reading process for simultaneously reading from each of said second and third line memories to output a video data group read from said second line memory as said first video data group and a video data group read from said third line memory as said second video data group; and a third reading process for simultaneously reading each of said third and first line memories to output a video data group read from said third line memory as said first video data and a video data group read from said first line memory from said second video data group.

3. An apparatus for enhancing the resolution of video data according to claim 1, wherein:

a frequency of a write signal and a frequency of a read signal supplied to said plurality of memories are made different from each other such that a sampling frequency is converted simultaneously with the processing for enhancing the vertical resolution of said incoming video data sequence.

* * * * *